(12) United States Patent
Worsley et al.

(10) Patent No.: US 8,809,230 B2
(45) Date of Patent: Aug. 19, 2014

(54) POROUS SUBSTRATES FILLED WITH NANOMATERIALS

(75) Inventors: Marcus A. Worsley, Hayward, CA (US); Theodore F. Baumann, Discovery Bay, CA (US); Joe H. Satcher, Jr., Patterson, CA (US); Michael Stadermann, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 286 days.

(21) Appl. No.: 13/195,752

(22) Filed: Aug. 1, 2011

(65) Prior Publication Data

US 2012/0028798 A1 Feb. 2, 2012

Related U.S. Application Data

(60) Provisional application No. 61/369,972, filed on Aug. 2, 2010, provisional application No. 61/473,537, filed on Apr. 8, 2011, provisional application No. 61/473,654, filed on Apr. 8, 2011.

(51) Int. Cl.
*H01B 1/18* (2006.01)

(52) U.S. Cl.
USPC ............................ 502/417; 252/502; 252/506

(58) Field of Classification Search
USPC .................................. 502/417; 252/502, 506
See application file for complete search history.

(56) References Cited

U.S. PATENT DOCUMENTS

| | | | |
|---|---|---|---|
| 5,207,814 A | 5/1993 | Cogliati et al. | |
| 5,879,744 A | 3/1999 | Cao et al. | |
| 5,885,953 A | 3/1999 | Jadesjö et al. | |
| 6,117,810 A * | 9/2000 | Lee et al. | 502/60 |
| 6,146,227 A | 11/2000 | Mancevski | |
| 6,277,318 B1 | 8/2001 | Bower et al. | |
| 6,333,016 B1 | 12/2001 | Resasco et al. | |
| 7,074,880 B2 * | 7/2006 | Rhine et al. | 528/310 |
| 7,196,122 B2 * | 3/2007 | Ryoo et al. | 523/218 |
| 7,378,188 B2 | 5/2008 | Struthers et al. | |
| 7,410,718 B2 | 8/2008 | Cooper et al. | |
| 7,811,711 B2 | 10/2010 | Cooper et al. | |
| 2002/0088938 A1 | 7/2002 | Colbert et al. | |
| 2002/0102203 A1 | 8/2002 | Smalley et al. | |
| 2002/0113714 A1 | 8/2002 | Smalley et al. | |
| 2002/0127336 A1 | 8/2002 | Smalley et al. | |
| 2002/0130353 A1 | 9/2002 | Lieber et al. | |
| 2003/0143327 A1 | 7/2003 | Schlaf et al. | |
| 2003/0148577 A1 | 8/2003 | Merkulov et al. | |
| 2009/0042101 A1 | 2/2009 | McGervey et al. | |
| 2010/0139823 A1 | 6/2010 | Gash et al. | |
| 2010/0187484 A1 | 7/2010 | Worsley et al. | |
| 2010/0190639 A1 | 7/2010 | Worsley et al. | |
| 2011/0024698 A1 | 2/2011 | Worsley et al. | |

OTHER PUBLICATIONS

Baker, W.S. et al. (2004) "Sulfur-functionalized carbon aerogels: a new approach for loading high-surface-area electrode nanoarchitectures with precious metal catalysts," J. Non-Cryst. Solids, 350:80-87.

Baumann, T. et al. (2008) "High surface area carbon aerogel monoliths with hierarchical porosity," J. Non-Cryst. Solids, 354(29):3513-3515.

Biener, J. et al. (2011) "Advanced Carbon Aerogels for Energy Applications," Energy & Environmental Science, 4:656-667.

Bordjiba, T. et al. (2007) "Synthesis and electrochemical capacitance of binderless nanocomposite electrodes formed by dispersion of carbon nanotubes and carbon aerogels," Journal of Power Sources, 172(2):991-998.

Cao, A. et al. (2001) "Synthesis of well-aligned carbon nanotube network on a gold-patterned quartz substrate," Applied Surface Science, 181(3-4):234-238.

Cassell, A.M. et al. (1999) "Directed Growth of Free-Standing Single-Walled Carbon Nanotubes," Journal of the American Chemical Society, 121(34):7975-7976.

Cassell, A.M. et al. (1999) "Large Scale CVD Synthesis of Single-Walled Carbon Nanotubes," J. Phys. Chem., 103(31):6484-6492.

Chen, X.W. et al. (2007) "The morphology, porosity and productivity control of carbon nanofibers or nanotubes on modified activated carbon," Carbon, 45:892-902, pp. 895-898.

Cheung, C.L. et al. (2000) "Carbon nanotube atomic force microscopy tips: Direct growth by chemical vapor deposition and application to high-resolution imaging," PNAS, 97(8):3809-3813.

Chung, S.W. et al. (2000) "Silicon nanowire devices," Applied Physics Letters, 76(15):2068-2070.

Cooper, E.B. et al. (1999) "Terabit-per-square-inch data storage with the atomic force microscope," Appl. Phys. Lett., 75:3566-3568.

Dai, H. (2000) "Nanotube Growth and Characterization," Topics in Applied Physics, 80:29-53.

De Heer, W.A. et al. (2000) "Industry sizes up nanotubes," Physics World, 13(6):49-53.

Dresselhaus, M.S. et al. (1996) "Carbon Nanotubes," The Physics of Fullerene-Based and Fullerene-Related Materials, Physics and Chemistry of Materials with Low-Dimensional Structures, 23:331-379.

(Continued)

*Primary Examiner* — Stuart Hendrickson
(74) *Attorney, Agent, or Firm* — Foley & Lardner, LLP (57) ABSTRACT

A composition comprising: at least one porous carbon monolith, such as a carbon aerogel, comprising internal pores, and at least one nanomaterial, such as carbon nanotubes, disposed uniformly throughout the internal pores. The nanomaterial can be disposed in the middle of the monolith. In addition, a method for making a monolithic solid with both high surface area and good bulk electrical conductivity is provided. A porous substrate having a thickness of 100 microns or more and comprising macropores throughout its thickness is prepared. At least one catalyst is deposited inside the porous substrate. Subsequently, chemical vapor deposition is used to uniformly deposit a nanomaterial in the macropores throughout the thickness of the porous substrate. Applications include electrical energy storage, such as batteries and capacitors, and hydrogen storage.

46 Claims, 4 Drawing Sheets

(56) References Cited

OTHER PUBLICATIONS

Dresselhaus, M.S. et al. (2000) Science of Fullerenes and Carbon Nanotubes, Academic Press, San Diego.

Du, H. et al. (2007) "Carbon aerogel supported Pt—Ru catalysts for using as the anode of direct methanol fuel cells," Carbon, 45:429-435.

Dupuis, A.C. (2005) "The catalyst in the CCVD of carbon nanotubes—a review," Progress in Materials Science, 50:929-961.

Fan, S. et al. (1999) "Self-Oriented Regular Arrays of Carbon Nanotubes and their Field Emission Devices," Science, 283:512.

Feaver, A. et al. (2007) "Coherent Carbon Cryogel-Ammonia Borane Nanocomposites for $H_2$ Storage," J. Phys. Chem. B, 111:7469-7472.

Fu, R. et al. (2005) "Formation of graphitic structures in cobalt- and nickel-doped carbon aerogels," Langmuir, 21:2647-2651.

Gross, A.F. et al. (2008) "Enhanced Hydrogen Storage Kinetics of $LiBH_4$ in Nanoporous Carbon Scaffolds," J. Phys. Chem. C, 112:5651-5657.

Kabbour, H. et al. (2006) "Toward New Candidates for Hydrogen Storage: High-Surface-Area Carbon Aerogels," Chem. Mater., 18(26):6085-6087.

Kind, H. et al. (1999) "Patterned films of nanotubes using microcontact printing of catalysts," Adv. Mater., 11:1285.

King, J.S. et al. (2008) "Ultralow loading Pt nanocatalysts prepared by atomic layer deposition on carbon aerogels," NanoLetters, 8(8):2405-2409.

Kong, J. et al. (1998) "Synthesis of individual single-walled carbon nanotubes on patterned silicon wafers," Nature, 395:878-881.

Li, Y. et al. (2001) "Preparation of Monodispersed Fe—Mo Nanoparticles as the Catalyst for CVD Synthesis of Carbon Nanotubes," Chem. Mater., 13:1008-1014.

Li, Y. et al. (2007) "Hydrogen Storage on Platinum Nanoparticles Doped on Superactivated Carbon," J. Phys. Chem. C, 111:11086-11094.

Li, G.R. et al. (2010) "Mesoporous $MnO_2$/Carbon Aerogel Composites as Promising Electrode Materials for High-Performance Supercapacitors," Langmuir, 26(4):2209-2213.

Li, P. et al. (2006) "Synthesis of carbon nanofiber/graphite-felt composite as a catalyst," Microporous and Mesoporous Materials, 95(1-3):1-7.

Long, J.W. et al. (2009) "Multifunctional $MnO_2$-Carbon Nanoarchitectures Exhibit Battery and Capacitor Characteristics in Alkaline Electrolytes," J. Phys. Chem. C, 113:17595-17598.

Lu, X.P. et al. (1993) "Thermal and electrical conductivity of monolithic carbon aerogels," J. Appl. Phys., 73:581.

Madou, M.J. Fundamentals of Microfabrication, The Science of Miniaturization, $2^{nd}$ Ed.:454-455.

Moreno-Castilla, C. et al. (2005) "Carbon aerogels for catalysis applications: An overview," Carbon, 43(3):455-465.

Nielsen, T.K. et al. (2010) "Confinement of MgH2 Nanoclusters within Nanoporous Aerogel Scaffold Materials," ASC Nano, 3(11):3521-3528.

Peigney, A. et al. (2001) "Specific surface area of carbon nanotubes and bundles of carbon nanotubes," Carbon, 39(4):507-514.

Rolison, D.R. et al. (2009) "Multifunctional 3D nanoarchitectures for energy storage and conversion," Chem. Soc. Rev., 38:226-252.

Rouquerol, F. (1999) Adsorption by Powders & Porous Solids, Academic Press, London.

Rouquerol, J. et al. (1994) "Recommendations for the Characterization of Porous Solids," Pure & Appl. Chem., 66(8):1739-1758.

Soh, H.T. et al. (1999) "Integrated nanotube circuits: controlled growth and ohmic contacting of single-walled carbon nanotubes," Appl. Phys. Lett., 75(5):627-629.

Steiner, S.A. et al. (2007) "Iron-Doped Carbon Aerogels: Novel Porous Substrates for Direct Growth of Carbon Nanotubes," Langmuir, 23(9):5161-5166.

Steiner, S.A. et al. (2009) "Nanoscale Zirconia as a Nonmetallic Catalyst for Graphitization of Carbon and Growth of Single- and Multiwall Carbon Nanotubes," J. Am. Chem. Soc., 131(34):12144-12154.

Su, D.S. et al. (2005) "Hierarchically Structured Carbon: Synthesis of Carbon Nanofibers Nested Inside or Immobilized onto Modified Activated Carbon," Angew. Chem., Int. Ed., 44(34):5488-5492.

Tao, Y. et al. (2007) "Conductive and Mesoporous Single-Wall Carbon Nanohorn/Organic Aerogel Composites," Langmuir, 23:9155-9157.

Tian, H.Y. et al. (2009) "Enhanced hydrogen storage capacity in carbon aerogels treated with KOH," Carbon, 47(8):2128-2130.

Tzeng, S.S. et al. (2006) "Growth of carbon nanofibers on activated carbon fiber fabrics," Carbon, 44(5):859-865.

Veziri, C.M. et al. (2009) "Growth and Morphology Manipulation of Carbon Nanostructures on Porous Supports," Carbon, 47(9):2161-2173.

Wang, H. et al. (2001) "Controlled synthesis of aligned carbon nanotube arrays on catalyst patterned silicon substrates by plasma-enhanced chemical vapor deposition," Applied Surface Science, 181(3-4):248-254.

Wei, Y.Y. et al. (2000) "Directed assembly of carbon nanotube electronic circuits by selective area chemical vapor deposition on prepatterned catalyst electrode structures," J. Vac. Sci. Technol. B, 18(6):3586.

Worsley, M.A. et al. (2008) "Synthesis and Characterization of Monolithic Carbon Aerogel Nanocomposites Containing Double-Walled Carbon Nanotubes," Langmuir, 24:9763-9766.

Worsley, M.A. et al. (2009) "Enhanced thermal transport in carbon aerogel nanocomposites containing double-walled carbon nanotubes," J. Appl. Phys., 105:084316.

Worsley, M.A. et al. (2009) "Mechanically robust and electrically conductive carbon nanotube foams," Appl. Phys. Lett., 94:073115.

Worsley, M.A. et al. (2009) "Properties of single-walled carbon nanotube-based aerogels as a function of nanotube loading," Acta Mater., 57(17):5131-5136.

Worsley, M.A. et al. (2010) "High Surface Area Carbon Aerogels as Porous Substrates for Direct Growth of Carbon Nanotubes," Chem. Commun., 46:9253-9255.

Worsley, M.A. et al. (2010) "Synthesis and characterization of monolithic, high surface area $SiO_2$/C and SiC/C composites," J. Mater. Chem., 20:4840-4844.

\* cited by examiner

POROUS SUBSTRATES FILLED WITH NANOMATERIALS

RELATED APPLICATIONS

This application claims priority to U.S. provisional applications U.S. Ser. Nos. 61/369,972 filed Aug. 2, 2010; 61/473,537 filed Apr. 8, 2011; and 61/473,654 filed Apr. 8, 2011, which are each incorporated herein by reference in their entireties for all purposes.

FEDERAL FUNDING STATEMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

A need exists to prepare better composite materials including nanostructured composite materials. For example, many energy applications such as capacitors and batteries require better performance of materials. Nanostructured materials provide the ability to engineer important properties such as surface area and electrical charge transport.

An important class of material is highly porous material which provides high surface area. For example, carbon aerogels (CAs) are a unique class of porous materials that are being commercialized and hold technological promise for a variety of applications, including catalysis, adsorption and energy storage.[1] The utility of these materials is derived, at least in part, from their high surface areas, electrically conductive frameworks, and tunable porosities. To expand the applications for these materials, efforts have focused on the incorporation of modifiers, such as carbon nanotubes (CNTs) or metal nanoparticles, into the carbon framework that can potentially enhance the thermal, electrical, mechanical, or catalytic properties of the aerogel.[2] For example, a new class of ultra low-density CNT-CA composites was recently reported that exhibit both high electrical conductivity and robust mechanical properties.[3] These CA composites are believed to be among the stiffest low-density solids reported and exhibit elastic behavior to compressive strains as large as about 80%. In these materials, however, the CNTs are embedded within the skeletal network of the CA and, as a result, the accessible surface area associated with the nanotubes is minimal. While this structural motif does serve to enhance the bulk electrical and mechanical properties of these low-density materials, a need exists for many applications to design CA composites that provide functional access to the surfaces of the CNTs. Other types of composite materials comprising nanomaterials such as nanowires and nanotubes are needed, particularly materials having macroscopic dimensions but nanostructured elements.

SUMMARY

At least some embodiments described herein provide a straightforward method for the fabrication of novel monolithic composites, including composites carbon nanotubes and carbon aerogel. These and other embodiments are described herein. Embodiments provided herein include compositions, devices, and articles, as well as methods of making and methods of using the compositions, devices, and articles.

For example, one aspect provides a composition comprising: at least one porous carbon monolith comprising internal pores, and at least one nanomaterial disposed throughout the internal pores.

In one embodiment, the nanomaterial is disposed uniformly throughout the internal pores.

In one embodiment, the porous carbon monolith comprises two external surfaces which define a width and a width middle for the monolith, and the nanomaterial is disposed uniformly at the width middle.

In one embodiment, the nanomaterial increases a volumetric surface area of the composition relative to a volumetric surface area of the porous carbon monolith considered independently of the nanomaterial.

In one embodiment, the nanomaterial has a weight, and the porous carbon monolith has a weight, and the weight of the nanomaterial is greater than the weight of the porous carbon monolith.

In one embodiment, the amount of the porous carbon monolith is less than about 75% by weight of the composition.

In one embodiment, the amount of the porous carbon monolith is less than about 50% by weight of the composition.

In one embodiment, the porous carbon monolith is an aerogel, a xerogel, or an open-cell foam.

In one embodiment, the porous carbon monolith is an aerogel.

In one embodiment, the porous carbon monolith is an activated carbon aerogel.

In one embodiment, the internal pores comprise a bimodal pore size distribution.

In one embodiment, the internal pores comprise pores which have an average diameter of 100 nm or more.

In one embodiment, the internal pores comprise one set of pores which have an average diameter of 1 micron or more and another set of pores which have an average diameter of 10 nm or less.

In one embodiment, the porous carbon monolith has a BET surface area of at least 2,000 $m^2/g$, independently of the nanomaterial disposed in the internal pores.

In one embodiment, the nanomaterial is a nanotube or a nanowire.

In one embodiment, the nanomaterial is a carbon nanotube.

In one embodiment, the nanomaterial is a multi-walled carbon nanotube.

In one embodiment, the composition further comprises catalyst adapted for nanomaterial growth.

In one embodiment, the composition comprising the porous carbon monolith and the nanomaterial has a BET surface area of at least 1,000 $m^2/g$.

In one embodiment, the composition has a bulk electric conductivity of at least 1 S/cm.

Another aspect comprises a composition comprising: at least one carbon aerogel comprising internal pores and at least one dimension which is at least 100 microns, wherein carbon nanotubes are disposed in the internal pores, wherein the amount of the carbon aerogel is less than about 75% by weight of the composition.

In one embodiment, the amount of the carbon aerogel is less than about 50% by weight of the composition.

In one embodiment, the carbon aerogel is a monolith.

In one embodiment, the carbon nanotubes are disposed uniformly in the internal pores.

In one embodiment, the composition further comprises catalyst for growth of the carbon nanotubes.

In one embodiment, the carbon nanotubes increase the volumetric surface area of the composition compared to the carbon aerogel.

In one embodiment, the carbon nanotubes increase the electrical conductivity of the composition compared to the carbon aerogel.

In one embodiment, the carbon aerogel comprise pores having an average pore diameter of at least 100 nm.

In one embodiment, the carbon aerogel comprises a bimodal pore size distribution.

In one embodiment, the composition comprising the carbon aerogel and the carbon nanotubes has a BET surface area of at least 1,000 m$^2$/g.

Another aspect provides a method comprising: providing a porous substrate having a thickness of 100 microns or more, wherein the porous substrate comprises a plurality of macropores throughout the thickness of the porous substrate; disposing a catalyst inside the porous substrate; and forming a nanomaterial in the macropores by vapor deposition, wherein the catalyst catalyzes the growth of the nanomaterial, and wherein the nanomaterial is deposited throughout a thickness of porous substrate.

In one embodiment, the forming step comprises allowing a precursor to the nanomaterial to fill up the macropores and then react the precursor in presence of catalyst to form the nanomaterial in the macropores.

In one embodiment, the substrate is an aerogel, a xerogel, or an open-cell foam.

In one embodiment, the catalyst comprises at least one metal.

In one embodiment, the average diameter of the macropores is 100 nm or more.

In one embodiment, the nanomaterial is a carbon nanotube.

In one embodiment, the deposition of the nanomaterial increases the bulk electric conductivity of the porous substrate by 50% or more.

In one embodiment, the deposition of the nanomaterial increases the mass of the porous substrate by 50% or more.

In one embodiment, the deposition of the nanomaterial increases the volumetric surface area of the porous substrate by 10% or more.

In one embodiment, the method further comprises the step of removing the porous substrate from the nanomaterial.

Another aspect provides a method comprising: providing a carbon aerogel having a thickness of 100 microns or more, wherein the carbon aerogel comprises a plurality of macropores throughout the thickness of the carbon aerogel; disposing a catalyst inside the carbon aerogel; and growing carbon nanotubes in the macropores by vapor deposition, wherein the catalyst catalyzes the growth of the carbon nanotubes, and wherein the carbon nanotubes are deposited throughout the thickness of porous substrate.

In one embodiment, the carbon nanotubes are formed from a carbon-containing precursor gas, and the carbon aerogel is first filled with the carbon-containing precursor gas before heating to grow the carbon nanotubes.

In one embodiment, the carbon aerogel comprises a bimodal pore size distribution.

In one embodiment, the carbon nanotubes are multi-walled carbon nanotubes.

Another aspect comprises making a carbon-nanotube-filled activated carbon aerogel, comprising the steps of: preparing an activated carbon aerogel substrate, and carbonizing the activated carbon aerogel substrate to produce the carbon nanotube-filled activated carbon aerogel.

Another aspect are articles comprising the composition described herein. For example, an article can comprise the compositions as described herein, wherein the article is a capacitor, a battery, an electrode, sensor, a membrane, a catalyst support, or hydrogen storage device.

In at least some embodiments, the approach involves the catalyzed CVD growth of multi-walled CNTs on the inner surfaces of activated CA substrates. In these embodiments, the bimodal pore structure of the substrate allows for efficient diffusion of the CVD gases through the aerogel during the growth process and provides substantial surface area for the growth of CNTs. Microstructural analysis of the composites indicates substantially uniform CNT yield throughout the free internal pore volume of CA monoliths with macroscopic dimensions. The resulting composite structures exhibit large surface areas and high electrical conductivity and, as such, provide a robust platform for the design of materials for a variety of applications, including, for example, battery electrodes, capacitors, membranes and/or catalyst supports. In addition, the flexibility associated with this approach provides ability to adapt material properties for specific applications. For example, the use of alternative graphitization catalysts can be used either to change characteristics (i.e. diameter, number of walls) of the CNTs or to grow other types of carbon nanostructures, such carbon nanobelts or nanocoils, within the activated CA substrate.

DETAILED DESCRIPTION

Introduction

References cited herein can be used to practice and better understand the claimed inventions and are incorporated by reference herein in their entireties for all purposes.

Priority US provisional applications U.S. Ser. Nos. 61/369,972 filed Aug. 2, 2010; 61/473,537 filed Apr. 8, 2011; and 61/473,654 filed Apr. 8, 2011 are each incorporated herein by reference in their entireties for all purposes.

The article, "High Surface Area Carbon Aerogels as Porous Substrates for Direct Growth of Carbon Nanotubes," Worsley et al, *Chem. Commun.*, 2010, 46, 9253-9255 (DOI: 10.1039/c0cc03457f) is hereby incorporated by reference in its entirety.

The article, "Advanced Carbon Aerogels for Energy Applications," Biener et al., *Energy & Environmental Science*, 2011, 4, 656-667, is hereby incorporated by reference in its entirety.

US Patent Publication 2011/0024698 to Worsely et al., "Mechanically Stiff, Electrically Conductive Composites of Polymers and Carbon Nanotubes" is hereby incorporated by reference in its entirety.

US Patent Publication 2010/0190639 to Worsley et al., "HIGH SURFACE AREA, ELECTRICALLY CONDUCTIVE NANOCARBON-SUPPORTED METAL OXIDE" is hereby incorporated by reference in its entirety.

US Patent Publication 2010/0187484 to Worsley et al., "MECHANICALLY ROBUST, ELECTRICALLY CONDUCTIVE ULTRALOW-DENSITY CARBON NANOTUBE-BASED AEROGELS" is hereby incorporated by reference in its entirety.

US Patent Publication 2010/0139823 to Gash et al., "PYROPHORIC METAL-CARBON FOAM COMPOSITES AND METHODS OF MAKING THE SAME" is hereby incorporated by reference in its entirety.

Various terms used in this patent application are described further hereinbelow.
CA=carbon aerogel
ACA=activated carbon aerogel
CNT=carbon nanotubes
CNT-CA=carbon nanotube and carbon aerogel composite
SWNT=single-walled carbon nanotubes
DWNT=double-walled carbon nanotubes
PVA=polyvinyl alcohol
CVD=chemical vapor deposition
TEM=transmission electron microscopy
SEM=scanning electron microscopy
RF=resorcinol and formaldehyde solids
BET=Brunauer-Emmett-Teller
"Mechanically Robust"=can withstand strains greater than 10% before fracture
"Electrically Conductive"=Exhibits an electrical conductivity of 10 S/m or greater.
"Carbon Nanotube-Based Aerogel"=porous carbon material comprising 5% to 95% carbon nanotubes by weight. In another embodiment, the porous carbon material can comprise 5% to 99% carbon nanotubes by weight.

Also, as used in the specification and claims, the singular form "a", "an" and "the" include plural references unless the context clearly dictates otherwise. For example, the term "a nanotube" includes a plurality of nanotubes.

As used herein, the term "comprising" is intended to mean that, for example, the compositions and methods include the recited elements, but do not exclude others. "Consisting essentially of" when used to define, for example, compositions and methods, shall mean excluding other elements of any essential significance to the combination for the intended use. "Consisting of" shall mean excluding more than trace elements of other ingredients and substantial method steps for administering the compositions of this invention. Embodiments defined by each of these transition terms are within the scope of this invention.

Embodiments are described herein for disposing of nanomaterials within porous substrates. For example, in some of the embodiments described herein, the fabrication of novel CNT-CA composites through the catalytic growth of CNTs by chemical vapor deposition (CVD) directly on the internal surface area of CA substrates is described. This approach, for at least some embodiments, offers a straightforward route to the design of monolithic carbon composite structures that exhibit both large surface areas and high electrical conductivity. While the CVD growth of carbon nanostructures on porous carbon substrates has been previously reported,[4] carbon deposition in those systems occurred primarily on the surfaces of powders or granular samples. By contrast, for at least some embodiments described herein, the embodiments represent the first example of uniform CNT growth throughout the internal pore volume of a monolithic porous carbon. High CNT yield within CA monoliths with macroscopic dimensions is shown. It is also shown that growth of the CNTs within these substrates can enhance the bulk electrical conductivity of the material. These CNT-CA composites are also mechanically robust and, as such, can be readily formed into different shapes for use as, for example, novel catalyst supports, electrodes for electrochemical devices, or membranes for adsorption or separation.

For example, one embodiment provides a composition comprising: at least one porous carbon monolith comprising internal pores, and at least one nanomaterial disposed throughout the internal pores.

Porous Carbon Monolith and Porous Substrate

Porous substrates and porous carbon monoliths are known in the art. A porous substrate can be used for depositing nanomaterial, through which the porous substrate is functionalized. The porous substrate can be an aerogel, a xerogel, or an open cell-foam. In a preferred embodiment, the porous substrate is a carbon aerogel or an activated carbon aerogel. In a more preferred embodiment, the porous substrate is an activated carbon aerogel prepared from, for example, resorcinol and formaldehyde. Description of carbon aerogel and activated carbon aerogel, as well as the preparation thereof, can be found in US 2011/0024698, US 2010/0190639, US 2010/0187484, US 2010/0139823, and Baumann et al., *J. Non-Cryst. Solids,* 354:3513 (2008), all of which are incorporated herein by reference in their entireties.

Monoliths and methods of making monoliths are described in, for example, U.S. Pat. Nos. 5,207,814; 5,885,953; 5,879,744; 7,378,188; 7,410,718; and 7,811,711.

The porous substrate can be, for example, at least 80% by weight carbon, or at least 85% by weight carbon, or at least 90% by weight carbon, or at least 95% by weight carbon, or at least 98% by weight carbon. The porous substrate can be substantially free of non-carbon materials such as silicates or binders including polymeric binders.

Sol-gel methods can be used to form an aerogel. The type of aerogel can include, for example, resorcinol-formaldehyde, resorcinol-furfural, phloroglucinol-formaldehyde, phenol-formaldehyde, cresol-formaldehyde, and phenol-furfuryl alcohol. Sol gel catalysts include, for example, acids and bases such as, for example, nitric acid, acetic acid, ascorbic acid, hydrochloric acid, sulfuric acid, sodium carbonate, sodium hydroxide, ammonium hydroxide, and calcium sulfate. Sol gel catalyst concentrations can be expressed in reactant-to-catalyst ratio (R/C) which can range from, for example, ratios of 10 to 5,000, or 10 to 2,000, or 10 to 1,000.

In one embodiment, an activated carbon aerogel can be formed according to the following exemplary steps: (1) creating a reaction mixture comprising, for example, resorcinol and formaldehyde, and also, for example, acetic acid as reaction catalyst; (2) curing the reaction mixture to form a wet gel; (3) washing the wet gel with, for example, acetone to remove water; (4) drying the wet gel using, for example, supercritical $CO_2$ to form a dry gel; (5) pyrolyzing the dry gel at, for example, 1050° C. under inert atmosphere (e.g., $N_2$) to form a carbon aerogel; and (6) thermally activate the carbon aerogel at, for example, 950° C. using, for example, $CO_2$ to form an activated carbon aerogel.

In some embodiments, the porous substrate can be characterized by a length, width, and height. Thickness can be also measured. The substrate can have two opposing surfaces which define a width and a width middle. At least one of the surfaces can be subjected to a vapor deposition process, and one can examine the extent to which the deposition occurs in the interior of the material. The thickness of the porous substrate can be 100 microns or more, or 300 microns or more, or 500 microns or more, or 700 microns or more. The porous substrate can be a monolithic solid. Examples include substantially slab shaped materials with a length, width, and height, wherein the length, width, and height are each at least 100 microns, or each at least 250 microns, or each at least 500 microns, or each at least 750 microns, or each at least one mm.

The porous substrate can be characterized by a surface area before the nanomaterial is disposed in the porous substrate to form a composite. For example, the surface area of the porous substrate can be 500 $m^2/g$ or more, or 1,000 $m^2/g$ or more, or 1,500 $m^2/g$ or more, or 2,000 $m^2/g$ or more, or 3,000 $m^2/g$ or more.

The electrical conductivity of the porous substrate can be, for example, 5 S/cm or less, or 4 S/cm or less, or 3 S/cm or less.

The porous substrate can exclude powders, particles, and/or granular samples of material. Rather, a monolith can be used. For example, a particle based approach, in contrast, is described in Su et al., *Angew. Chem., Int. Ed.,* 2005, 44, 5488. In one embodiment, the porous substrate does not comprise an aggregate of activated carbon particles.

Moreover, the porous substrate can be mechanically robust. One can determine the appropriate balance of mechanical robustness and surface area. The porous substrate can be formed into different shapes for different applications.

Pores

The porous substrate can provide pores which are adapted to have a nanomaterial disposed therein including throughout the porous substrate, including the interior of the porous substrate. The pores can be evaluated with an average pore size and a pore size distribution. The pores can provide a continuous network to allow material for the nanomaterial to be disposed throughout the porous substrate.

In embodiment described herein, pores can include macropores, micropores, and mesopores, as well as combinations thereof. Macropores can be generally defined as pores of a diameter or width of more than 50 nm. Micropores can be generally defined as pores of a diameter or width of less than 2 nm. Mesopores can be generally defined as pores of a diameter or width of 2-50 nm. See, for example, *Pure & Appl. Chem.* Vol. 66, No. 8, pp. 1739-1758 (1994).

The porous substrate can comprise a plurality of macropores throughout its thickness. In one embodiment, the average diameter of the macropores inside the porous substrate is 100 nm or more, or 200 nm or more, or 500 nm or more, or 1 micron or more. In a further embodiment, the macropores form a continuous network inside the porous substrate, allowing the precursor gas of a nanomaterial to be able to diffuse uniformly throughout the thickness of the porous substrate.

In addition to macropores, the porous substrate may also comprise micropores and/or mesopores throughout its thickness. In one embodiment, the average diameter of the combined micropores and/or mesopores (or pores) is 10 nm or less, or 5 nm or less, or 2 nm or less. The number of micropores and the mesopores can be increased by activating, including thermally activating, a carbon aerogel.

In one embodiment, a porous substrate with bimodal pore size distribution is used. For example, the porous substrate can have a first set of pores of an average diameter of 1 micron or more and a second set of pores of an average diameter of 10 nm or less. Larger pores can provide access to the whole material and help avoid "clogging" of the external surfaces. Smaller pores can increase the internal surface area.

In one embodiment, the porous substrate is not dominated by mesopores. Rather, micropores and macropores can be the predominant pore structure.

Nanomaterials/Carbon Nanotubes

Any nanomaterial that can be deposited, grown, or otherwise disposed in a porous substrate via, for example, vapor deposition, including chemical vapor deposition, can be used. In one embodiment, the nanomaterial can be nanotubes, nanowires, nanorods, nanofibers, nanocoils, nanoribbons, or nanoparticles.

The nanomaterial can be a carbon nanomaterial and a carbon-containing nanomaterial.

In a preferred embodiment, the nanomaterial can be silicon nanowires or carbon nanotubes, including single-walled carbon nanotubes, double-walled carbon nanotubes, or multi-walled carbon nanotubes. The average diameter of the silicon nanowire deposited inside the porous substrate can be, for example, 10 nm to 500 nm, or 10 nm to 100 nm. The average diameter of carbon nanotubes deposited inside the porous substrate can be, for example, 1 nm to 50 nm. The average diameter of the multi-walled carbon nanotubes deposited inside the porous substrate can be, for example, 10 nm to 50 nm.

In one embodiment, carbon nanotubes are the predominant nanomaterial disposed inside the pores. Graphitic nanostructures can be only minimally present or substantially excluded in favor of the carbon nanotubes. Graphitic nanostructures can include, for example, ribbons, coils, or fibers.

Carbon nanotubes are described in Marc J. Madou's *Fundamentals of Microfabrication, The Science of Miniaturization,* 2nd Ed., pages 454 455, including carbon nanotube preparation by CVD from patterned catalysts. Carbon nanotubes are also described in the text, *Carbon Nanotubes,* by Dresselhaus et al., Springer-Verlag, 2000. See also, Special-Section, "Carbon Nanotubes" *Physics World,* vol. 13, pp. 29 53, 2000. Carbon nanotubes can be single-walled carbon nanotubes (SWNTs), multi-walled carbon nanotubes (MWNTs), nanohorns, nanofibers, or nanotubes. They can be conducting or semiconducting depending on the form of the nanotube. They can be open, closed, and have different kinds of spiral structure. They can be in zigzag and armchair form and have varying steepness which alters the chiral form.

Documents which are incorporated by reference, and which relate to nanotube technology, including CVD fabrication and catalysis, applications of carbon nanotubes in devices, purification of nanotubes once formed, and which can be used to in practicing the present invention include: (1) Hannes Kind et al. *Advanced Materials,* 1999, 11, 1285. (2) Y. Y. Wei et al. *J. Vac. Sci. Technol. B,* 2000, 18(6), 3586 (3) H. Wang et al. *Applied Surface Science,* 2001, 181, 248 254. (4) Chin Li Cheung, *PNAS,* 2000, 97(8), 3809 3813. (5) J. H. Hafner, J. Am. Chem. Soc., 1999, 21, 9750 9751. (6) Cao et al. *Applied Surface Science,* 2001, 181, 234 238. (7) Dai et al., "Growth and Characterization of Carbon Nanotubes," book chapter in "Topics in Applied Physics", Vol. 80, Ed. M. Dresselhaus, Springer Verlag (2000). (8) Dai et al. *Appl. Phys. Lett.,* 75, 3566 3568 (1999). (9) Dai et al. *J. Am. Chem. Soc.,* 121 7975 7976 (1999). (10) Dai et al. *Phys. Chem.,* 103, 6484 6492 (1999). (11) Dai et al. *Appl. Phys. Lett.,* 627 629, 75 (1999). (12) Dai et al. *Science,* 283, 512 (1999). (13) Dai et al. Nature, 395, 878, (1998). (14) M. S. Dresselhaus et al., *Science of Fullerenes and Carbon Nanotubes,* Academic Press, San Diego, 1996. (15) Li et al, *Chem. Mater.,* 13, 1008 1014, (2001). (16) U.S. Patent Publication, 2003/0148577 ("Controlled Alignment of Catalytically Grown Nanostructures in a Large Scale Synthesis Process") by Merkulov et al., published Aug. 7, 2003. (17) U.S. Patent Publication 2002/0127336, published Aug. 1, 2002 to Richard Smalley et al. (18) U.S. Patent Publication 2002/0113714, published Aug.

1, 2002 to Richard Smalley et al. (19) U.S. Patent Publication 2002/0102203, published Aug. 1, 2002 to Richard Smalley et al. (20) U.S. Pat. No. 6,183,714 ("Method of Making Ropes of Single-Wall Carbon Nanotubes") to Richard Smalley et al., issued Feb. 6, 2001. (21) U.S. Patent Publication 2002/0088938 to Colbert et al., published Jul. 11, 2002 ("Methods for forming an array of single-wall carbon nanotubes and compositions thereof"). (22) U.S. Patent Publication 2003/0143327, published Jul. 31, 2003 to Rudiger et al. (23) U.S. Pat. No. 6,146,227 to Mancevski issued Nov. 14, 2000 ("Method for manufacturing carbon nanotubes as functional elements of MEMS devices"). (24) U.S. Pat. No. 6,277,318 to Bower et al., issued Aug. 21, 2001 ("Method for fabrication of patterned carbon nanotube films"). (25) U.S. Pat. No. 6,333,016 to Resasco et al. issued Dec. 25, 2001 ("Method of producing carbon nanotubes"). (26) U.S. Patent Publication 2002/0130353 to Lieber et al., published Sep. 19, 2002 (Nanoscopic wire-based devices, arrays, and methods of their manufacture").

Methods for making Si nanowires via vapor deposition including CVD are known in the art. For example, Si nanowires may be grown by metal-catalyzed CVD, which is based on a vapor-liquid solid (VLS) growth process. During growth, a precursor gas such as $SiH_4$ can decompose at the nucleating particle catalyst surface, Si can diffuse in the catalyst, then when supersaturation occurs, the Si atoms can precipitate out at the catalyst-substrate interface to form a silicon nanowire of diameter similar to that of the catalyst nucleating particle. During this vapor-liquid-solid (VLS) growth process, nano-sized metal catalysts, such as gold nucleating particles, can be used to catalyze the decomposition of the precursor gas such as $SiH_4$. Other catalysts, such as Zn and Ti, are also known to be suitable for making Si nanowires. In one embodiment, the precursor gas is heated to a temperature at which 1) the gas dissociates into its free component atoms, and 2) the nucleating particles (e.g. metal catalyst) melts to a liquid. The free gas molecules can then diffuse into the metal catalyst to form a liquid alloy droplet. Methods for making Si nanowire are disclosed in, for example, Chung et al., *Applied Physics Letters*, 76(15): 2068-2070 (2000), and US Patent Publication 2011/0156003.

Catalyst and Catalyst Precursors

Nanomaterial can be disposed or deposited in the porous substrate with use of catalyst or without catalyst.

To deposit nanomaterial in the porous substrate, preferably, a catalyst can be used to catalyze the growth of nanomaterial in the macropores. Any catalyst that can catalyze the growth of nanomaterial can be used. The catalyst can be a metal such as, for example, Fe, Co, Ni, Au, Cu, Mo, and Re. An oxide like zirconium oxide can be used. The catalyst can be, for example, a main group metal such as Sn. The catalyst can be, for example, a semiconductor like Si, Ge, or SiC. It can be a non-metal. In one embodiment, for example, the catalyst is Ni. In another embodiment, the catalyst is Fe or Co. The catalyst can be in the form of nanoparticles.

The catalyst can be deposited inside the porous substrate using established metal ion impregnation and reduction techniques, as described in, for example, Li et al., *J. Phys. Chem. C*, 111:11086 (2007), which is incorporated herein by reference in its entirety. In one embodiment, for example, Ni catalyst is loaded into the porous substrate according to the following steps: (1) immersing the porous substrate in a dilute $NiCl_2$ solution, (2) removing the porous substrate from the metal salt solution and drying it under a stream of $N_2$, and (3) reducing the $Ni^{2+}$ ions adsorbed within the porous substrate to metal nanoparticles at elevated temperatures using $H_2$.

The content of the catalyst relative to the porous substrate can be measured. It can be, for example, 1 wt. % to 20 wt. %, or 2 wt. % to 15 wt. %, or 3 wt. % to 10 wt. %.

Vapor Deposition and CVD

Vapor deposition and chemical vapor deposition is known among skilled artisans. In one embodiment, the catalyst facilitates the conversion of the precursor gas to the nanomaterial inside the catalyst-loaded porous substrate at a growth temperature. In a preferred embodiment, before the growth temperature is applied, the precursor material (e.g., gas) is diffused into the pores, including macropores, to reach a uniform precursor gas concentration throughout the thickness of the porous substrate. This diffusion is executed before conversion of precursor material to the nanomaterial. In one embodiment, for example, the step of depositing the nanomaterial does not comprise heating the porous substrate before the precursor gas is substantially fully or fully diffused into the porous substrate, i.e., heating before the precursor gas reaches substantially the same or the same concentration inside and outside the porous substrate.

The growth temperature can be, for example, 600° C. to 1,000° C., or 700° C. to 900° C., or about 800° C. The exposure time between the precursor gas and the porous substrate can be, for example, 2-10 minutes, 3-7 minutes, or 4-6 minutes, or about 5 minutes. The flow rate of the precursor gas can be, for example, 5-20 sccm, or 8-12 sccm, or about 10 sccm.

In one embodiment, chemical vapor deposition is used to uniformly deposit carbon nanotubes throughout the thickness of the porous substrate according to the following steps: (1) exposing the catalyst-loaded porous substrate to a flow of a precursor gas (e.g. $C_2H_4$) to allow uniform diffusion of the precursor gas in the pores, including macropores, throughout the thickness of the porous substrate; (2) heating the porous substrate to allow sufficient carbon nanotube growth; and (3) cooling the porous substrate filled with carbon nanotubes.

Characterization of Composites

The nanomaterial can be disposed throughout the internal pores. In particular, the nanomaterial can be disposed uniformly throughout the internal pores. For example, the porous carbon monolith can comprises two external surfaces which define a width and a width middle for the monolith, and the nanomaterial can be disposed uniformly at the width middle. In a monolith, for example, the number and length of the nanotubes can be measured at different parts of the material, and can be relatively uniformly found throughout the material. Methods known in the art can be used to characterize the interior of the composite material.

The nanomaterials can be formed at or disposed at a region which is at least 100 microns, or at least 200 microns, or at least 300 microns, or at least 350 microns, from the nearest surface.

In one embodiment, the deposition of the nanomaterial via CVD increases the bulk electrical conductivity of the porous substrate by 20% or more, or 50% or more, or 80% or more. In one embodiment, after the deposition of the nanomaterial via CVD, the porous substrate has a bulk electrical conductivity of 4 S/cm or more, or 6 S/cm or more, or 8 S/cm or more, or 10 S/cm or more.

The nanomaterial can increase the volumetric surface area of the composition relative to the volumetric surface area of the porous carbon monolith considered independently of the nanomaterial. For example, in one embodiment, the nanomaterial increases the volumetric surface area of the porous substrate by 5% or more, or 10% or more, or 20% or more.

In one embodiment, after the deposition of the nanomaterial via, for example, CVD, the porous substrate can have a surface area of 500 m$^2$/g or more, or 700 m$^2$/g or more, or 1,000 m$^2$/g or more, or 1,300 m$^2$/g, or 1,500 m$^2$/g or more.

In one embodiment, the nanomaterial can increase the mass of the porous substrate by 20% or more, or 50% or more, or 80% or more. For example, the amount of the porous carbon monolith can be less than about 75% by weight, or less than 50% by weight, of the composition. For example, in a composite material, the nanomaterial can have a weight, and the porous carbon monolith can have a weight, and the weight of the nanomaterial can be greater than or equal to the weight of the porous carbon monolith.

In one embodiment, the deposition of the nanomaterial via CVD increases the hydrogen storage capacity of the porous substrate by 10% or more, or 20% or more, or 50% or more, or 80% or more.

Devices and, Applications, and Methods of Using

The aerogel deposited with nanomaterial has excellent potential in a variety of applications and devices. See, for example, Biener et al., *Energy & Environmental Science* article cited above. Applications include, for example, hydrogen storage, electrical energy storage, capacitors and supercapacitors, batteries (including lithium and lithium-ion batteries), catalysis, electrocatalysis, desalination, membranes, sensors, and actuators.

In one embodiment, the aerogel deposited with nanomaterial can be used in a capacitor. In another embodiment, the aerogel deposited with nanomaterial can be used in a hydrogen storage device.

In a further embodiment, the aerogel deposited with nanomaterial can be used as an electrode in a Li-ion battery, wherein the Li-ion battery can have a capacity of 300 Ah/kg or more, or 450 Ah/kg or more, or 600 Ah/kg or more, or 800 Ah/kg or more.

In one embodiment, the processes used herein can be used for the fabrication of the nanomaterial without the substrate. For example, the porous substrate can be removed to yield the nanomaterial, e.g., carbon nanotubes. One can obtain more nanomaterial via a three dimensional growth process compared to a two dimensional growth process.

In another embodiment, the composite monolith can be ground up into smaller units of the material.

Working Examples

Additional embodiments are also provided in the following non-limiting working examples. For example, ACA-CNT composites were prepared and characterized.

1. Porous Substrate

Figure 1:
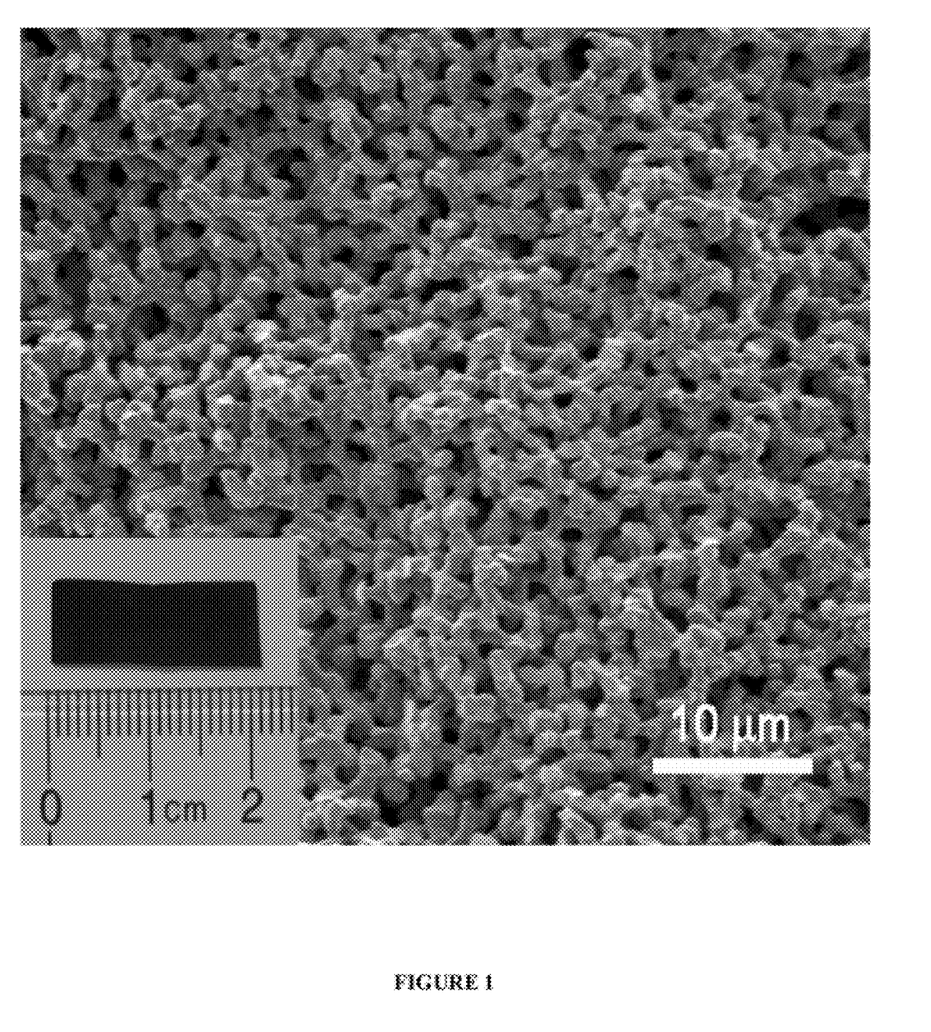
FIG. 1 shows an SEM image of an activated carbon aerogel (ACA) substrate prior to CVD treatment. The inset show the size of the ACA monolith used for the CVD experiments.

Activated CAs (ACAs) with large surface areas (over 2000 m$^2$/g) and bimodal porosity (macro- and micropores) were utilized as CVD substrates. Relative to mesoporous CAs, these macroporous substrates provided enhanced diffusion efficiency of the CVD synthesis gas throughout the aerogel structure and substantially more surface area for deposition of catalyst particles and growth of CNTs. The ACAs were prepared through carbonization and thermal activation of organic aerogels derived from resorcinol and formaldehyde, as previously described.[5] The skeletal structure of the ACA substrate comprises interconnected micron-sized carbon ligaments that define the continuous macroporous network (FIG. 1). The ligaments were porous as well, as the activation process creates micropores and small mesopores in the walls of the carbon framework. Monolithic ACA parts (20×5×1 mm, see inset of FIG. 1) with BET surface areas about 2400 m$^2$ g$^{-1}$ were used.

More particularly, the ACA substrates were prepared through the sol-gel polymerization of resorcinol (R) and formaldehyde (F) using acetic acid as the reaction catalyst, as previously reported.[5] The organic RF aerogels were then carbonized at 1050° C. under N$_2$ and subsequently activated at 950° C. using carbon dioxide. An electric cutting tool was used to slice thin slab of the ACA with approximate dimensions of 20×5×1 mm.

2. Catalyst

The ACA substrates were loaded with CNT catalysts using metal ion impregnation and reduction techniques.[6] Nickel was selected as catalyst because nickel nanoparticles are known to efficiently catalyze the growth of carbon nanotubes.[7] In this process, the monolithic slabs were immersed in dilute NiCl$_2$ solutions to allow for complete infiltration of the aerogel porosity. After drying the parts under a stream of nitrogen, the Ni$^{2+}$ ions adsorbed within the ACA were reduced to metal nanoparticles at elevated temperatures using H$_2$, yielding uniform dispersions of accessible and catalytically active nickel nanoparticles within the substrate.

More particularly, for the catalyst loading, these parts were immersed in a 0.1 M acetone solution of NiCl$_2$.6H$_2$O for about 24 h, then removed from the metal salt solution and dried under a stream of N$_2$. The slabs of the Ni-loaded CA were placed in a 2.5-cm long segment of 1-cm diameter quartz tubing and inserted into the middle of a 2.7-cm inner diameter quartz process tube. The tube was flushed with He at a rate of 60 sccm for 10-20 minutes and then placed into a clamshell furnace. The sample was then heated to 400° C. under a stream of He (60 sccm) and H$_2$ (40 sccm) and held at that temperature for 10 min to reduce the impregnated nickel ions to metal nanoparticles.

3. Carbon Nanotube Growth

The CVD growth of CNTs was performed by exposing thin slabs of the Ni-loaded ACA to a flow of H$_2$ and C$_2$H$_4$ for a period of five minutes at 800° C. While a variety of CVD conditions (growth temperature, exposure times, precursor flow rates) were tested in the course of this work, the conditions described above provided the best yield of CNTs within the aerogel substrates.

More particularly, after catalytic nickel nanoparticle formation, ethylene (10 sccm) was introduced to the He/H$_2$ stream and the temperature was held at 400° C. for 5 min to facilitate diffusion of ethylene into the sample. Finally, the sample was heated to 800° C. at a rate of 40° C./min and held at that temperature for 5 min to allow for CNT growth. The tube was subsequently removed from the furnace and cooled to room temperature under a flow of He (60 sccm).

4. Characterization of Composite

Figure 2:
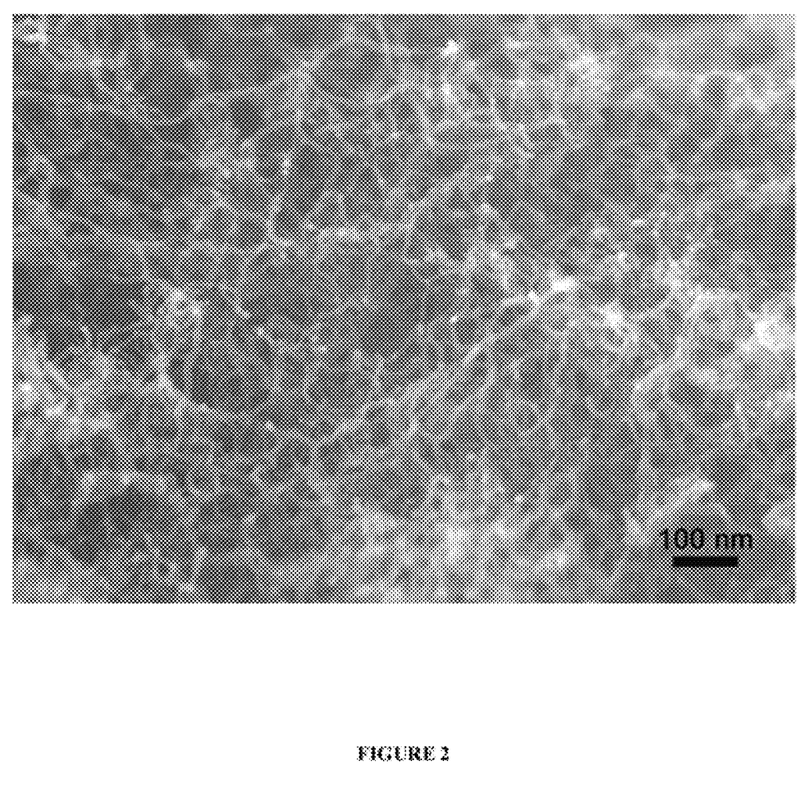
FIG. 2 shows an SEM image of the multi-walled CNT network grown within the Ni-loaded ACA substrate.

The Ni-loaded ACA materials exhibited significant increases in mass following CVD treatment, indicating carbon deposition had occurred on the aerogel substrate. For the growth conditions used in this work, the mass of the Ni$^{2+}$- loaded aerogel parts approximately doubled following the metal reduction and CVD treatment steps. Examination of these materials by scanning electron microscopy (SEM) shows entangled networks of CNTs throughout the ACA architecture (FIG. 2). The CNTs appear to grow from the surfaces of the Ni-loaded carbon substrate into the free pore volume of the aerogel.

Figure 3:
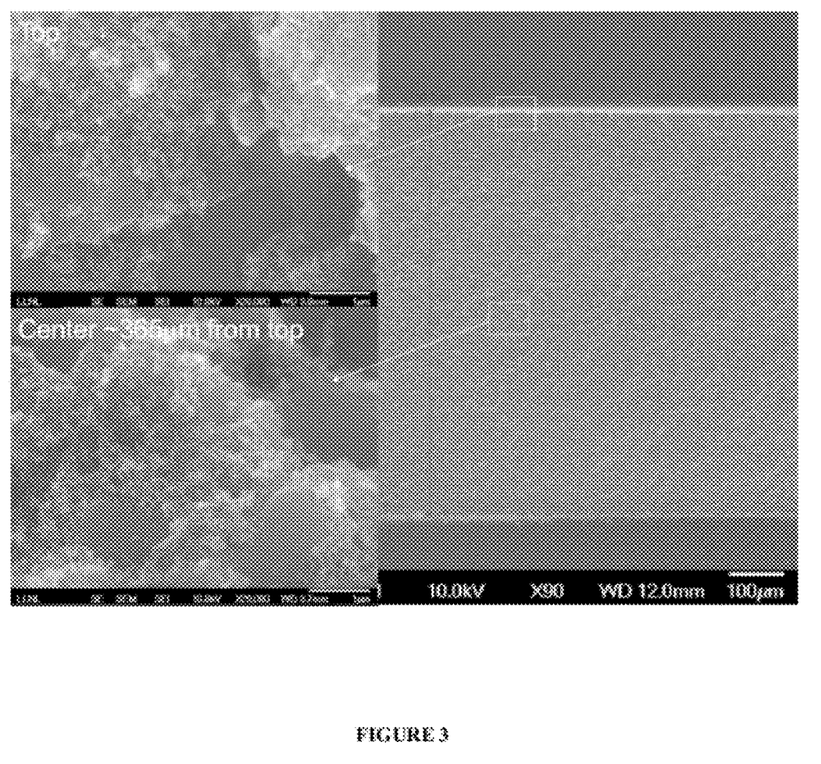
FIG. 3 shows an SEM images of a fracture surface of the ACA-CNT composite showing uniform CNT yield from (a) the surface to (b) the center (about 365 μm from surface) of the monolith.
Figure 4:
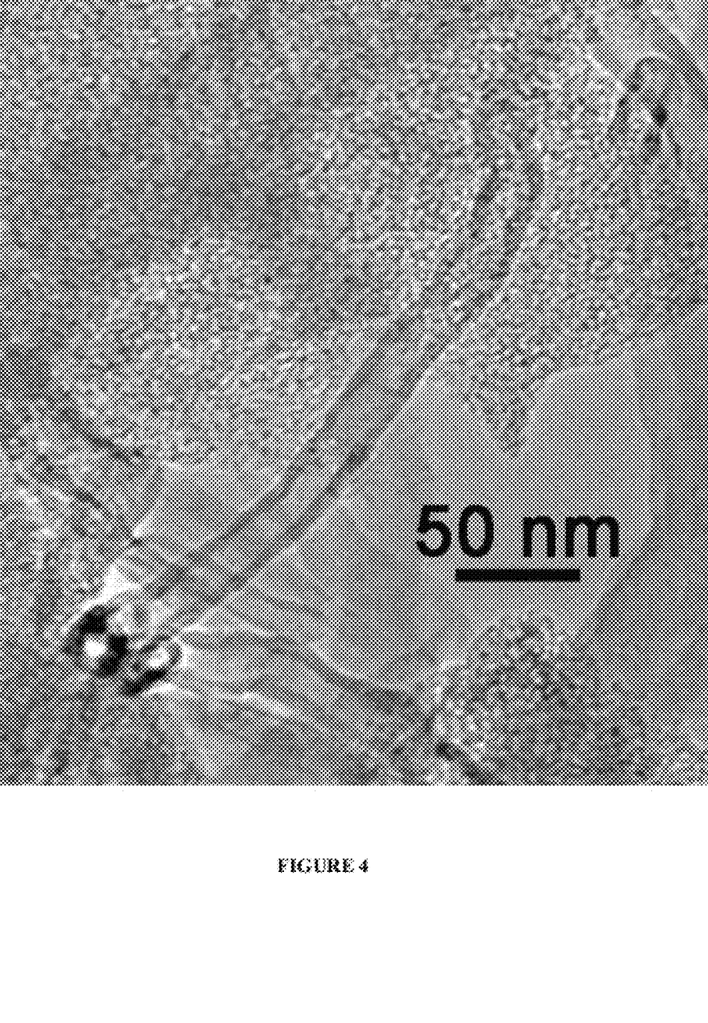
FIG. 4 shows a TEM image of multi-walled CNTs grown within the Ni-loaded ACA substrate.

To determine the uniformity of CNT yield throughout the ACA slab, we examined cross-sectional areas of fracture surfaces of these monolithic substrates following CVD treatment. As shown in FIG. 3, CNT yield is indeed uniform across the full thickness of the aerogel slab (about 0.75 mm), indicating that the pore structure of the ACA does allow for efficient diffusion of CVD gases during the growth process. Closer examination of the CNTs by transmission electron microscopy (TEM) shows that the tubes appear to be multi-walled with diameters between 10 and 30 nm (FIG. 4). The range of nanotube diameters is likely a consequence of the size distribution of nickel catalyst particles formed during the reduction step. Interestingly, the formation of other graphitic nanostructures, such as ribbons, coils or fibers, was not observed in these substrates after CVD treatment.

The BET surface areas of the ACA-CNT composites (about 1200 $m^2 g^{-1}$) were lower than that of the untreated ACA substrate. This decrease in surface area can be attributed to plugging of the micropores and small mesopores in the ACA substrate that occurs during both catalyst incorporation and CVD treatment, as evidenced by the reduced micropore volume observed in the ACA-CNT composites (about 0.45 $cm^3 g^{-1}$) relative to that of the parent ACA substrate (0.89 $cm^3 g^{-1}$). Despite these changes in textural properties, the approach presented here allows for the high-yield growth of accessible CNT networks within the substrate, while retaining relatively large surface areas in the composite structure.

On a volumetric basis, the surface area in the ACA-CNT monoliths (about 580 $m^2/cm^3$) was actually greater than that of the untreated ACA (480 $m^2/cm^3$). A large percentage of this surface area can be attributed to the microporosity of the aerogel substrate, as evidenced by the micropore volume (0.45 $cm^3/g$) measured for the composite material. Nevertheless, the presence of the CNTs within the ACA architecture increased the volumetric surface area of these monolithic composites. Volumetric surface areas were calculated from the gravimetric surface areas and the bulk densities of the ACA substrates before (0.2 $g/cm^3$) and after (0.49 $g/cm^3$) CVD treatment.

The influence of the CNTs on the bulk electrical properties of these monolithic carbon structures was also examined. Electrical conductivity in CAs typically scales with density, as electron transport through the material is dependent on the interconnectivity of the carbon framework.[8] It was recently demonstrated that dispersions of double-walled and single-walled CNTs within the carbon network, even at low loading levels, enhance the bulk electrical conductivity of CAs.[2d,9] For the examples described here, however, the CNTs populate the surfaces of the aerogel substrate and are not embedded directly in the carbon skeleton. Yet the ACA-CNT composites exhibited significant increases in electrical conductivity following the CVD treatment. For example, the electrical conductivity of an ACA-CNT slab with a bulk density of 0.49 $g cm^{-1}$ was measured at 6.6 $S cm^{-1}$, nearly a twofold enhancement relative to that of the untreated ACA (3.6 $S cm^{-1}$). While the primary conduction pathway in these composites is likely still the skeletal network of the ACA, these results indicate that the CNTs are involved in electron transport through the monolith.

Additional measurement information is provided. The bulk densities of the composites were determined by measuring the dimensions and mass of the monolithic samples. Scanning electron microscopy (SEM) was performed on a JEOL 7401-F. Imaging was done at 5-10 keV (20 µA) in SEI mode with a working distance of 2-8 mm. Transmission electron microscopy (TEM) was performed on a Phillips CM300FEG operating at 300 keV. Surface area and pore volume were determined using Brunauer-Emmett-Teller (BET) and Dubinin-Ashtakov (DA) methods using as ASAP 2010 Surface Area Analyzer (Micromeritics).[10] Composite samples were heated to 300° C. under vacuum ($10^{-5}$ Torr) for 24 hours to remove all adsorbed species prior to analysis. Electrical conductivity was measured using the four-probe method similar to previous studies.[8] Metal electrodes were attached to the ends of the CNT-ACA slabs. The amount of current transmitted through the sample during measurement was 100 mA and the voltage drop along the sample was measured over distances of 3 to 6 mm with seven or more measurements taken on each sample.

Comparative Example

For at least some of these embodiments, an important aspect was the design of a CA substrate with requisite porosity to allow for efficient diffusion of the CVD gases through the monolith during the growth process. Previous efforts in this area showed that the short mean free path of diffusion intrinsic to traditional mesoporous CAs (materials with pore diameters primarily between about 2 and about 50 nm) limited the growth of CNTs within these substrates.[4a,d] For example, CVD growth of CNTs within Fe-loaded CAs did not occur beyond a depth of about 1 µm from the surface of the monolithic CA substrate. For another comparative example, see FIG. 9 in reference 4a.

Cited References

[1] a) T. K. Nielsen, K. Manickam, M. Hirscher, F. Besenbacher, T. R. Jensen, *ACS Nano* 2010, 3, 3521; b) G. R. Li, Z. P. Feng, Y. N. Ou, D. Wu, R. Fu, Y. X. Tong, *Langmuir* 2010, 26, 2209; c) D. R. Rolison, J. W. Long, J. C. Lytle, A. E. Fischer, C. P. Rhodes, T. M. McEvoy, M. E. Bourg, A. M. Lubers, *Chem. Soc. Rev.* 2009, 38, 226; d) H. Y. Tian, C. E. Buckley, S. B. Wang, M. F. Zhou, *Carbon* 2009, 47, 2112; e) J. S. King, A. Wittstock, J. Biener, S. O. Kucheyev, Y. M. Wang, T. F. Baumann, S. K. Giri, A. V. Hamza, M. Baeumer, S. F. Bent, *NanoLetters* 2008, 8, 2405; f) A. F. Gross, J. J. Vajo, S. L. Van Atta, G. L. Olson, *J. Phys. Chem. C* 2008, 112, 5651; g) A. Feaver, S. Sepehri, P. Shamberger, A. Stowe, T. Autrey, G. Z. Cao, *J. Phys. Chem. B* 2007, 111, 7469; h) H. Kabbour, T. F. Baumann, J. H. Satcher, A. Saulnier, C. C. Ahn, *Chem. Mater.* 2006, 18, 6085; i) C. Moreno-Castilla, F. J. Maldonado-Hodar, *Carbon* 2005, 42, 455.

[2] a) M. A. Worsley, J. D. Kuntz, J. H. Satcher, T. F. Baumann, *J. Mater. Chem.* 2010, 20, 4840; b) J. W. Long, M. B. Sassin, A. E. Fischer, D. R. Rolison, A. N. Mansour, V. S. Johnson, P. E. Stallworth, S. G. Greenbaum, *J. Phys. Chem. C* 2009, 113, 17595; c) M. A. Worsley, J. H. Satcher, and T. F. Baumann, *J. Appl. Phys.* 2009, 105, 084316; d) M. A. Worsley, J. H. Satcher, Jr. and T. F. Baumann, *Langmuir,* 2008, 24, 9763; e) Y. Tao, D. Noguchi, C. M. Yang, H. Kanoh, H. Tanaka, M. Yudasaka, S. Iijima, K. Kaneko, *Langmuir* 2007, 23, 9155; f) T. Bordjiba, M. Mohamedi, L. H. Dao, *J. Power Sources* 2007, 172, 991; g) H. Du, B. Li, F. Kang, R. Fu, Y. Zeng, *Carbon* 2007, 45, 429; h) Fu, R.;

Baumann, T. F.; Cronin, S.; Dresselhaus, G.; Dresselhaus, M. S.; Satcher, J. H. *Langmuir,* 2005, 21, 2647; i) W. S. Baker, J. W. Long, R. M. Stroud, D. R. Rolison, *J. Non-Cryst. Solids* 2004, 350, 80.

[3] M. A. Worsley, S. O. Kucheyev, J. H. Satcher, A. V. Hamza, T. F. Baumann, *Appl. Phys. Lett.* 2009, 94, 073115.

[4] a) S. S. Steiner, T. F. Baumann, B. C. Bayer, R. Blume, M. A. Worsley, W. J. MoberlyChan, E. L. Shaw, R. Schlogl, A. J. Hart, S. Hofmann, B. L. Wardle *J. Am. Chem. Soc.,* 2009, 131, 12144; b) C. M. Veziri, G. N. Karanikolos, G. Pilatos, E. C. Vermisoglou, K. Giannakopoulos, C. Stogios, N. K. Kanellopoulos, *Carbon* 2009, 47, 2161; c) X. W. Chen, D. S. Su, S. B. A. Hamid, R. Schlögl, *Carbon,* 2007, 45, 895; d) S. A. Steiner, T. F. Baumann, J. Kong, J. H. Satcher, M. S. Dresselhaus, *Langmuir* 2007, 23, 5161; e) S. S. Tzeng, K. H. Hung, T. H. Ko, *Carbon* 2006, 44, 859; f) P. Li, T. Li, J. H. Zhou, Z. J. Sui, Y. C. Dai, W. K. Yuan and D. Chen, *Microporous Mesoporous Mater.,* 2006, 95, 1; g) D. S. Su, X. Chen, G. Weinberg, A. Klein-Hoffman, O. Timpe, S. B. A. Hamid and R. Schlogl, *Angew. Chem., Int. Ed.,* 2005, 44, 5488

[5] T. F. Baumann, M. A. Worsley, T. Y. Han, J. H. Satcher, *J. Non-Cryst. Solids* 2008, 354, 3513.

[6] Y. Li, R. T. Yang, *J. Phys. Chem. C* 2007, 111, 11086.

[7] A. C. Dupuis, *Prog. Mater. Sci.* 2005, 50, 929.

[8] X. P. Lu, O. Nilsson, J. Fricke, R. W. Pekala, *J. Appl. Phys.* 1993, 73, 581.

[9] M. A. Worsley, P. J. Pauzauskie, S, O. Kucheyev, J. M. Zaug, A. V. Hamza, J. H. Satcher, T. F. Baumann, *Acta Mater.* 2009, 57, 5131.

[10] F. Rouquerol, J. Rouquerol, K. Sing, *Adsorption by Powders & Porous Solids*, Academic Press, London, 1999.

[11] A. Peigney, C. Laurent, E. Flahaut, R. R. Bacsa and A. Rousset, *Carbon*, 2001, 39, 507.

Additional Embodiment

A for Silicon Nanowires

Additional embodiments are described here as "Embodiments A". See, for example, U.S. Provisional Application Ser. No. 61/473,537 filed Apr. 8, 2011 which is hereby incorporated by reference in its entirety for all purposes ("SILICON NANOWIRES ON CARBON AEROGEL SCAFFOLD").

One form of nanomaterial is the nanowire, including silicon nanowires. By way of additional background, silicon is a promising anode material for Li-ion batteries. The theoretical capacity of a silicon anode is 4200 Ah/kg. The lithium alloys with the silicon to form Li 4.4 Si. During the intercalation process, the volume of the electrode can increase to as much as 400% of the original volume. These volume changes may cause the Si to lose contact with the current collector, reducing capacity and shortening battery lifetime.

One way of overcoming these limitations has been to coat silicon onto a current collector as a thin film, but these coatings typically have too little active material to make a viable battery. Alternatively, silicon in the form of nanowires have been demonstrated as viable electrodes. The nanowires are deposited via chemical vapor deposition onto a metal foil, which acts as the current collector. These devices showed capacities of 2100 Ah/kg at high discharge rates, based on the mass of the silicon. However, if the total mass of the electrode is used as basis for calculating the capacity, the capacity drops significantly: the silicon nanowires have a density of 2.33 g/cm$^3$, a height of ~10 um, and a volume occupancy of less than 100%. The electrode, on the other hand, has a density of 8 g/cm$^3$ and a thickness of 20 µm. Thus, the capacity calculated by total mass drops to less than 120 Ah/kg, which is not substantially better than that of conventional Li-ion anodes.

This disclosure provides an efficient and cost effective system to overcome this limitation.

Additional embodiments are summarized. In one aspect, this disclosure provides a silicon nanowire-based anode with a substantially higher loading rate of silicon nanowires. A conductive porous conductor, can be used as a substrate. The pore size of the conductor can be in the 10-50 µm range. The conductor may have a secondary pore size in the nanometer range. The surface area of the scaffold can range from 50-220 cm$^2$/cm$^3$.

The silicon nanowires are synthesized directly onto this scaffold. Catalyst may be deposited by immersing the scaffold in an aqueous solution of the salt of the catalyst and subsequent precipitation of the catalyst onto the scaffold, or by patterning the catalyst onto the scaffold using a polymeric template. The synthesis of the nanowires is preformed using chemical vapor deposition.

The thickness of the active material is no longer limited by the wire length and can be chosen in thicknesses equal to that of a conventional Li-ion anode (150-200 µm). For an identical volume occupancy of nanowires, the amount of silicon increases by a factor of 40. Factoring in the reduced density of the scaffold material (2.2 g/cm$^3$ for carbon, at 24% volume occupancy), the achievable capacity of the monolithic electrode should lie around 650 Ah/kg, more than five times the capacity currently achieved on a flat electrode.

For easier integration of the scaffold material, the scaffold can be milled into particles and deposited onto a metal electrode like a conventional battery material. When this process is used, the capacity drops to 350 Ah/kg, still almost three times as high as the capacity of the flat electrode.

The cost of this type of anode per Ah of capacity is expected to be lower than that of an anode made on a flat substrate, since a greater amount of nanowires can be produced at identical use of reactants and furnace time:

Additional detailed description is provided.

Provided herein is a novel anode structure for Li-ion batteries based on silicon nanowires. The nanowires are synthesized in a conductive porous structure. In this manner, the volumetric density of the silicon nanowires can be drastically increased, and the mass of non-functional material in the anode structure is decreased. The anode structure can be used as monolithic block. In one embodiment for silicon nanowires, it can be milled into 50 µm-sized particles and utilized in a conventional fabrication method.

Thus, in one aspect, provided is an article comprising, or alternatively consisting essentially of, or yet further consisting of, at least one lithium-ion battery comprising, or alternatively consisting essentially of, or yet further consisting of, at least one anode, wherein the anode comprises, or alternatively consists essentially of, or yet further consist of, at least one porous conductor comprising external and internal surfaces, wherein the porous conductor further comprises silicon nanowires. Non-limiting examples of porous conductors include, an aerogel, such as a carbon aerogel, a xerogel, or an open-cell foam.

Thus, in one aspect, the conductive scaffold is an article comprising: or alternatively consisting essentially of, or yet further consisting of, at least one porous conductor comprising external and internal surfaces, wherein the porous conductor internal surfaces are functionalized directly with at least one material which is an active material for energy storage. In one aspect, the porous conductor has pores for which the aspect ratio and pore shape are adapted to enhance a mass transport rate and reduce internal resistance and concentration polarization through the pores for use in energy storage.

In another aspect, the porous conductor is one or more of an aerogel, such as a carbon aerogel.

In a further aspect, the material conformally coats the internal surfaces of the porous conductor. In a yet further aspect, the porous conductor comprises a bimodal pore structure. Alternatively, the porous conductor comprises a bimodal pore structure comprising (i) micropores or mesopores, and (ii) macropores. Non-limiting examples of such include a bimodal pore structure comprising (i) micropores or mesopores, and (ii) macropores, wherein the micropores have an average pore diameter of less than 2 nm, or alternatively less than 1.5 nm, or alternatively less than 1.0 nm, or alternatively less than 0.5 nm, and wherein micropores or mesopores are interconnected by a continuous network of the macropores which have an average pore diameter of 100 nm to 10 microns, and variations there between.

This conductor can have pores, e.g., column-shaped pores. The material can comprise a metal or metal oxide, non-limiting examples of such include titanium dioxide, manganese dioxide, cobalt dioxide, and/or ruthenium.

Various dimensions are contemplated. A non-limiting example is a porous conductor having a surface area of about 50 to about 220 $cm^2/cm^3$.

In one aspect, the porous conductor has pores with a bimodal pore size distribution. Yet further, the porous conductor has pores with a bimodal pore size distribution, wherein one set of pores has an average diameter of at least one micron, and a second set of pores has an average diameter of less than 10 nm.

Various methods known to the skilled artisan can be used to grow the nanowires, non-limiting examples of which include by chemical vapor deposition. In a further aspect, the silicon nanowires are made by chemical vapor deposition and the porous conductor comprises catalyst for formation of the silicon nanowires.

The thickness of the conductor can vary, e.g., the porous conductor can have a thickness of about 150 to about 200 microns.

In addition, the silicon nanowires can have an average diameter of about 10 nm to about 500 nm, or about 10 nm to about 100 nm.

Also provided is a method of making the material, the method comprising, or alternatively consisting essentially of, or yet further consisting of, grinding into a powder or having a powder comprising a material comprising at least one porous conductor comprising external and internal surfaces, wherein the porous conductor further comprises silicon nanowires. In one aspect, the powder is deposited onto an electrode. Electrodes containing the powder are further provided herein.

An alternative method comprises, or alternatively consists essentially of, or yet further consists of, providing a material containing at least one porous conductor having external and internal surfaces, providing a catalyst in the pores of the material, and depositing by chemical vapor deposition silicon nanowires in the porous conductor.

Materials produced by these methods are further provided herein and devices containing them, e.g., batteries, battery-powered devices or hybrid electric devices, are also provided.

Additional description for aerogels and composite materials can be found in, for example, U.S. Patent Publication Nos. 2009/0042101; 2010/0139823; 2010/0187484; 2010/0190639; and 2011/0024698.

One embodiment provides an article comprising: at least one lithium-ion battery comprising at least one anode, wherein the anode comprises: at least one porous conductor comprising external and internal surfaces, wherein the porous conductor further comprises silicon nanowires.

In one embodiment, the porous conductor is an aerogel. In one embodiment, wherein the porous conductor is a carbon aerogel. In one embodiment, the porous conductor has a surface area of about 50 to about 220 $cm^2/cm^3$. In one embodiment, the porous conductor has pores with a bimodal pore size distribution. In one embodiment, the porous conductor has pores with a bimodal pore size distribution, wherein one set of pores has an average diameter of at least one micron, and a second set of pores has an average diameter of less than 10 nm.

In one embodiment, the silicon nanowires are made by chemical vapor deposition. In one embodiment, the silicon nanowires are made by chemical vapor deposition and the porous conductor comprises catalyst for formation of the silicon nanowires.

In one embodiment, the porous conductor has a thickness of about 150 to about 200 microns. In one embodiment, the silicon nanowires have an average diameter of about 10 nm to about 500 nm, or about 10 nm to about 100 nm.

Another embodiment provides a method comprising: providing a material comprising at least one porous conductor comprising external and internal surfaces, wherein the porous conductor further comprises silicon nanowires; grinding the material into a powder.

In one embodiment, the method further comprises the step of depositing the powder onto an electrode.

Another embodiment provides a method comprising: providing a material comprising at least one porous conductor comprising external and internal surfaces, providing a catalyst in the pores of the material, depositing by chemical vapor deposition silicon nanowires in the porous conductor.

In one aspect, this disclosure provides a silicon nanowire-based anode with a substantially higher loading rate of silicon nanowires. A conductive porous conductor can be used as a substrate. The pore size of the conductor is in the 10-50 μm range.

Additional Embodiment

B

Additional embodiments are described here as "Embodiments B". See, for example, U.S. Provisional Application Ser. No. 61/473,654 filed Apr. 8, 2011 which is hereby incorporated by reference in its entirety for all purposes ("NANOWIRES AND NANOTUBE SYNTHESIS USING 3-D POROUS SUBSTRATES").

By way of additional background, nanomaterials, such as carbon nanotubes, silicon nanowires, or nanoparticles, have emerged in the last decade as advanced materials for applications ranging from sensing and logic circuits to energy storage and structural fillers. To date, most of these applications have not been commercially realized due to difficulties with nanomaterial synthesis and processing. For example, most synthesis methods for nanotubes or nanowires require a substrate on which catalytic growth of the nanomaterial is performed. In almost all cases, the substrate is flat to minimize the impact of mass transport on the synthesis. This approach severely limits the volume of nanomaterial production, increases the cost of the materials and reduces the flexibility for applications.

This disclosure provides an efficient and cost effective system to overcome these limitations.

This disclosure provides a strategy to address the limitations of the current state of the art and by changing the architecture of the substrate. Utilization of a three-dimensionally porous solid as a substrate provides significantly more surface area for growth of nanomaterials relative to a flat substrate, and thus has the potential to Improve both the rate and cost of nanomaterials production. Even if a substrate with relatively large pore sizes (10 to 100 microns in diameter) is chosen, the available surface area is still enhanced by three to four orders of magnitude over that of a flat substrate.

In one aspect, provided herein is a novel approach for the production of carbon nanotubes and inorganic nanowires that utilizes three-dimensionally porous substrates, such as aerogels, xerogels or open cell foams. In this approach, the catalytic growth of the nanomaterials occurs on the inner surfaces of the porous substrate. Due to the increased surface area available for growth of the nanowires or nanotubes, these porous substrates allow production of the nanomaterials at a higher rate and lower cost than those techniques that utilize flat surfaces as substrates.

The pore structures of the substrates are design to allow efficient transport of gas- or liquid-phase precursors to the catalysts that are distributed on the internal surface area. In addition, the pore structure of the substrate can engineered to control the morphology of the nanotubes/wires. For example, isolated micropores can be created on the inner surfaces of the substrate that serve as nucleation sites for catalyst nanoparticles. These micropores will define the size and morphology of the catalysts during deposition and prevent ripening of these particles during the nanowire growth, thereby providing control over the final nanowire dimensions.

These substrates can be engineered as sacrificial templates that are removed (either chemically or thermally) from the nanotube/wires after growth. Alternatively, the properties of the substrate can be tailored to allow for integration of the substrate/nanowire composite structure directly into the device of interest. As an example, silicon nanowires grown on the inner surfaces of an electrically-conductive porous carbon substrate can be used as an anode for next generation Li-ion batteries. Finally, the porous substrate approach enables the fabrication of well-separated nanotubes/wires without post-processing steps that can potentially degrade the as-grown material. Applicants have demonstrated the utility of this approach in the growth of multi-walled carbon nanotubes on the inner surfaces of carbon aerogel structures.

Further detailed description is provided.

Provided herein is an article comprising, or alternatively consisting essentially of, or yet further consisting of, at least one porous conductor, wherein the porous conductor comprises at least one nanomaterial in the pores of the porous conductor. Non-limiting examples of nanomaterials include a nanotube or a nanowire, e.g., a carbon nanotube, an inorganic nanowire or a silicon nanowire, including mixtures thereof.

In one aspect, the porous substrate comprises an aerogel, a xerogel, or an open-cell foam.

The porous substrate can comprise micropores, wherein catalyst nanoparticles are disposed in the micropores which catalyze growth of the nanomaterial. In another aspect, the porous substrate can comprise micropores, wherein catalyst nanoparticles are disposed in the micropores which catalyze growth of the nanomaterial, wherein a diameter of the nanomaterial is determined by a diameter of the micropore.

Devices and materials containing the articles are further provided herein. Such devices include, for example, an energy storage device, an electrode for a capacitor, an ultracapacitor or an electrode for a battery, e.g., an electrode for a Li-ion battery.

Also provided herein is a method for producing the articles, the method comprising, or alternatively consisting essentially of, or yet further consisting of, growing at least one nanomaterial in at least one porous conductor, wherein the at least one porous conductor comprises external and internal surfaces, and in the presence of a catalyst. In a further aspect, the method comprises, or alternatively consists essentially of, or yet further consists of, removing the porous conductor after the nanomaterial is grown. Various methods are known to the skilled artisan for removing the porous conductor. Non-limiting examples include thermal removal after the nanomaterial is grown or chemical removal after the nanomaterial is grown.

Materials produced by these methods as well as their use are also provided herein.

It is to be understood that while the invention has been described in conjunction with the above embodiments, that the foregoing description and examples are intended to illustrate and not limit the scope of the invention. Other aspects, advantages and modifications within the scope of the invention will be apparent to those skilled in the art to which the invention pertains.

Additional description for aerogels and composite materials can be found in, for example, U.S. Patent Publication Nos. 2009/0042102; 2010/0139823; 2010/0187484; 2010/0190639; and 2011/0024698.

One embodiment provides an article comprising: at least one porous conductor, wherein the porous conductor comprises at least one nanomaterial in the pores of the porous conductor.

Another embodiment provides that the nanomaterial is a nanotube or a nanowire.

In another embodiment, the nanomaterial is a carbon nanotube. In another embodiment, the nanomaterial is an inorganic nanowire. In another embodiment, the nanomaterial is a silicon nanowire.

In another embodiment, the porous substrate comprises an aerogel, a xerogel, or an open-cell foam.

In another embodiment, the porous substrate comprises micropores, wherein catalyst nanoparticles are disposed in the micropores which catalyze growth of the nanomaterial.

In another embodiment, the porous substrate comprises micropores, wherein catalyst nanoparticles are disposed in the micropores which catalyze growth of the nanomaterial, wherein a diameter of the nanomaterial is determined by a diameter of the micropore.

In another embodiment, the article is an energy storage device. In another embodiment, the article is an electrode for a capacitor or an ultracapacitor. In another embodiment, the article is an electrode for a battery. In another embodiment, the article is an electrode for a Li-ion battery. Another embodiment provides a method comprising growing in the presence of a catalyst at least one nanomaterial in at least one porous conductor, the porous conductor comprising external and internal surfaces.

In another embodiment, the porous conductor is removed after the nanomaterial is grown. In another embodiment, the porous conductor is thermally removed after the nanomaterial is grown. In another embodiment, the porous conductor is chemically removed after the nanomaterial is grown.

Provided herein is an article containing at least one nanomaterial in the pores of the porous conductor. Non-limiting examples of nanomaterials include a nanotube or a nanowire, e.g., a carbon nanotube, an inorganic nanowire or a silicon nanowire, including mixtures thereof.

Applicants are providing this description to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

What is claimed is:

1. A composition comprising:
at least one porous carbon monolith comprising internal pores, and at least one nanomaterial disposed throughout the internal pores, wherein the nanomaterial is a nanotube or a nanowire, and wherein the porous carbon monolith is an aerogel, a xerogel, or an open-cell foam.

2. The composition of claim 1, wherein the nanomaterial is disposed uniformly throughout the internal pores.

3. The composition of claim 1, wherein the porous carbon monolith comprises two external surfaces which define a width and a width middle for the monolith, and the nanomaterial is disposed uniformly at the width middle.

4. The composition of claim 1, wherein the nanomaterial increases a volumetric surface area of the composition relative to a volumetric surface area of the porous carbon monolith considered independently of the nanomaterial.

5. The composition of claim 1, wherein the nanomaterial has a weight, and the porous carbon monolith has a weight, and the weight of the nanomaterial is greater than the weight of the porous carbon monolith.

6. The composition of claim 1, wherein the amount of the porous carbon monolith is less than about 75% by weight of the composition.

7. The composition of claim 1, wherein the amount of the porous carbon monolith is less than about 50% by weight of the composition.

8. The composition of claim 1, wherein the porous carbon monolith is an aerogel.

9. The composition of claim 1, wherein the porous carbon monolith is an activated carbon aerogel.

10. The composition of claim 1, wherein the internal pores comprise a bimodal pore size distribution.

11. The composition of claim 1, wherein the internal pores comprise macropores which have an average diameter of 100 nm or more.

12. The composition of claim 1, wherein the internal pores comprise one set of pores which have an average diameter of 1 micron or more and another set of pores which have an average diameter of 10 nm or less.

13. A composition comprising:
at least one porous carbon monolith comprising internal pores, and at least one nanomaterial disposed throughout the internal pores, wherein the porous carbon monolith has a BET surface area of at least 2,000 m²/g, independently of the nanomaterial disposed in the internal pores.

14. The composition of claim 13, wherein the nanomaterial is a carbon nanotube.

15. The composition of claim 13, wherein the nanomaterial is a multi-walled carbon nanotube.

16. The composition of claim 13, the composition further comprising catalyst adapted for nanomaterial growth.

17. The composition of claim 1, wherein the composition comprising the porous carbon monolith and the nanomaterial has a BET surface area of at least 1,000 m²/g.

18. The composition of claim 1, wherein said composition has a bulk electric conductivity of at least 1 S/cm.

19. A composition comprising:
at least one carbon aerogel comprising internal pores and at least one dimension which is at least 100 microns, wherein carbon nanotubes are disposed in the internal pores, wherein the amount of the carbon aerogel is less than about 75% by weight of the composition.

20. The composition of claim 19, wherein the amount of the carbon aerogel is less than about 50% by weight of the composition.

21. The composition of claim 19, wherein the carbon aerogel is a monolith.

22. The composition of claim 19, wherein the carbon nanotubes are disposed uniformly in the internal pores.

23. The composition of claim 19, wherein the composition further comprises catalyst for growth of the carbon nanotubes.

24. The composition of claim 19, wherein the carbon nanotubes increase the volumetric surface area of the composition compared to the carbon aerogel.

25. The composition of claim 19, wherein the carbon nanotubes increase the electrical conductivity of the composition compared to the carbon aerogel.

26. The composition of claim 19, wherein the carbon aerogel comprise macropores having an average pore diameter of at least 100 nm.

27. The composition of claim 19, wherein the carbon aerogel comprises a bimodal pore size distribution.

28. The composition of claim 19, wherein the composition comprising the carbon aerogel and the carbon nanotubes has a BET surface area of at least 1,000 m²/g.

29. A method for making the composition of claim 1, comprising:
providing a porous substrate having a thickness of 100 microns or more, wherein the porous substrate comprises a plurality of macropores throughout the thickness of the porous substrate;
disposing a catalyst inside the porous substrate; and
forming a nanomaterial in the macropores by vapor deposition, wherein the catalyst catalyzes the growth of the nanomaterial, and wherein the nanomaterial is deposited throughout a thickness of porous substrate.

30. The method of claim 29, the forming step comprises allowing a precursor to the nanomaterial to fill up the macropores and then react the precursor in presence of catalyst to form the nanomaterial in the macropores.

31. The method of claim 29, wherein the substrate is an aerogel, a xerogel, or an open-cell foam.

32. The method of claim 29, wherein the catalyst comprises at least one metal.

33. The method of claim 29, wherein the average diameter of the macropores is 100 nm or more.

34. The method of claim 29, wherein the nanomaterial is a carbon nanotube.

35. The method of claim 29, wherein the deposition of the nanomaterial increases the bulk electric conductivity of the porous substrate by 50% or more.

36. The method of claim 29, wherein the deposition of the nanomaterial increases the mass of the porous substrate by 50% or more.

37. The method of claim 29, wherein the deposition of the nanomaterial increases the volumetric surface area of the porous substrate by 10% or more.

38. The method of claim 29, further comprising the step of removing the porous substrate from the nanomaterial.

39. A method for making the composition of claim 19, comprising:
  providing a carbon aerogel having a thickness of 100 microns or more, wherein the carbon aerogel comprises a plurality of macropores throughout the thickness of the carbon aerogel;
  disposing a catalyst inside the carbon aerogel; and
  growing carbon nanotubes in the macropores by vapor deposition, wherein the catalyst catalyzes the growth of the carbon nanotubes, and wherein the carbon nanotubes are deposited throughout the thickness of carbon aerogel.

40. The method of claim 39, wherein the carbon nanotubes are formed from a carbon-containing precursor gas, and the carbon aerogel is first filled with the carbon-containing precursor gas before heating to grow the carbon nanotubes.

41. The method of claim 39, wherein the carbon aerogel comprises a bimodal pore size distribution.

42. The method of claim 39, wherein the carbon nanotubes are multi-walled carbon nanotubes.

43. An article comprising the composition of claim 1, wherein the article is a capacitor, a battery, an electrode, sensor, a membrane, a catalyst support, or hydrogen storage device.

44. The composition of claim 1, wherein the nanomaterial is a carbon nanotube.

45. The composition of claim 1, wherein the nanomaterial is a silicon nanowire.

46. The composition of claim 19, wherein the carbon aerogel is an activated carbon aerogel.

* * * * *